Figure 1:
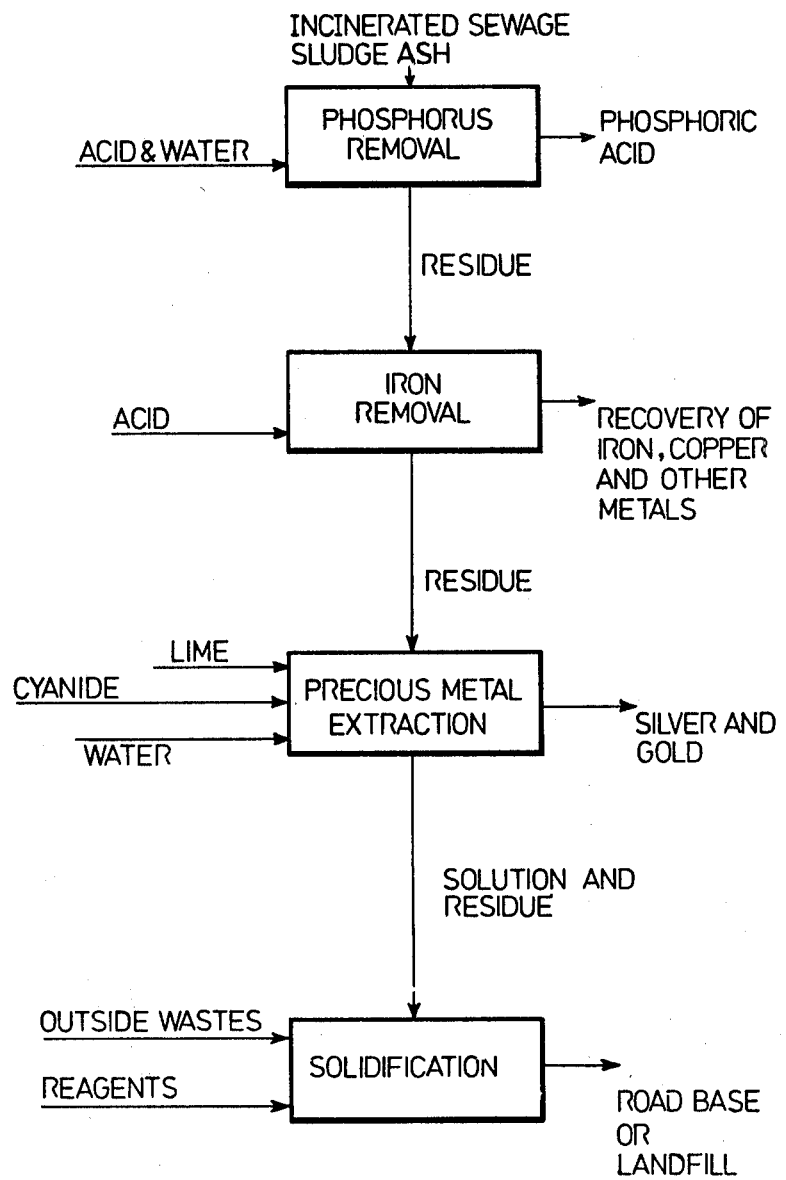

United States Patent [19]

Krofchak

[11] 4,216,012

[45] Aug. 5, 1980

[54] PROCESS FOR THE TREATMENT OF INCINERATED SEWAGE SLUDGE ASH

[76] Inventor: David Krofchak, 160 Torbay Rd., Markham, Ontario, L3R 1G6, Canada

[21] Appl. No.: 23,224

[22] Filed: Mar. 23, 1979

[30] Foreign Application Priority Data

Apr. 4, 1978 [GB] United Kingdom ............... 13203/78
Jul. 26, 1978 [GB] United Kingdom ............... 31188/78

[51] Int. Cl.$^2$ ............................................ C22B 11/08
[52] U.S. Cl. .................................... 75/101 R; 75/105; 75/118 R; 75/121; 210/53; 423/29; 423/304
[58] Field of Search ................. 75/101 R, 118 R, 105, 75/121, 97; 210/53; 423/29, 304

[56] References Cited

U.S. PATENT DOCUMENTS

| | | |
|---|---|---|
| 1,192,945 | 8/1916 | Sherwood .......................... 75/118 R |
| 3,677,741 | 7/1972 | Stenzel ............................... 75/101 R |
| 3,969,107 | 7/1976 | Lippert et al. ...................... 75/118 R |
| 4,110,212 | 8/1978 | Krofchak .............................. 210/53 |

*Primary Examiner*—G. Ozaki
*Attorney, Agent, or Firm*—Robert F. Delbridge; Arne I. Fors

[57] ABSTRACT

A process for the treatment of incinerated sewage sludge ash containing silicic compounds and metal values including phosphorus and at least one precious metal comprises leaching the ash in an acid solution in a first leach to dissolve phosphorus. The leach solution is separated from the undissolved residue, which is then treated to recover at least one precious metal.

16 Claims, 2 Drawing Figures

PROCESS FOR THE TREATMENT OF INCINERATED SEWAGE SLUDGE ASH

This invention relates to the treatment of incinerated sewage sludge ash containing silicic compounds and metal values including phosphorus and at least one precious metal.

It is common practice at many large sewage plants to burn dewatered sludge, sometimes known as filter cake, in an incinerator. The resultant ash is a mainly inorganic residue containing various metal and silicic compounds. The ash has a much smaller volume than the original sewage sludge, and has been used as land fill material. However, the disposal of this ash without further treatment may cause serious environmental pollution. The potential of such ash for causing pollution may readily be observed from the following analysis, in percentage by weight, of a typical ash obtained from incineration of dewatered sewage sludge:

| | | | |
|---|---|---|---|
| $Al_2O_3$ | 11.60 | Ni | 0.02 |
| $Fe_2O_3$ | 15.30 | Cu | 0.27 |
| CaO | 13.00 | Zn | 0.38 |
| MgO | 2.92 | Cr | 0.86 |
| $TiO_2$ | 3.54 | Ba | 0.21 |
| $MnO_2$ | 0.20 | Pb | 0.24 |
| $SiO_2$ | 30.00 | Zr | 0.32 |
| $P_2O_5$ | 20.50 | Others | 0.64 |

It is possible that toxic heavy metals such as chromium, lead or copper may leach out from the ash over the course of time at the site where the ash has been dumped, and contaminate the water in the ground at and around the disposal site.

Another disadvantage of the untreated ash is that it is light in weight, finely divided and dusty, with the result that it is difficult to handle, transport and dump. Thus, the disposal of such ash is becoming an increasing problem in many parts of the world.

It will be noted from the above list that the ash contains various elements, such as phosphorus, iron and copper which would be of value if they could be recovered from the ash. Further, it has been found that incinerated sewage sludge ash contains significant small amounts of precious metals, namely gold and silver, and it would clearly be extremely useful if such precious metals could be recovered.

It is therefore an object of the invention to provide a process for treating incinerated sewage sludge ash in such a manner that at least precious metal values can be recovered from the ash, and such that an environmentally acceptable end product can be produced.

Figure 2:
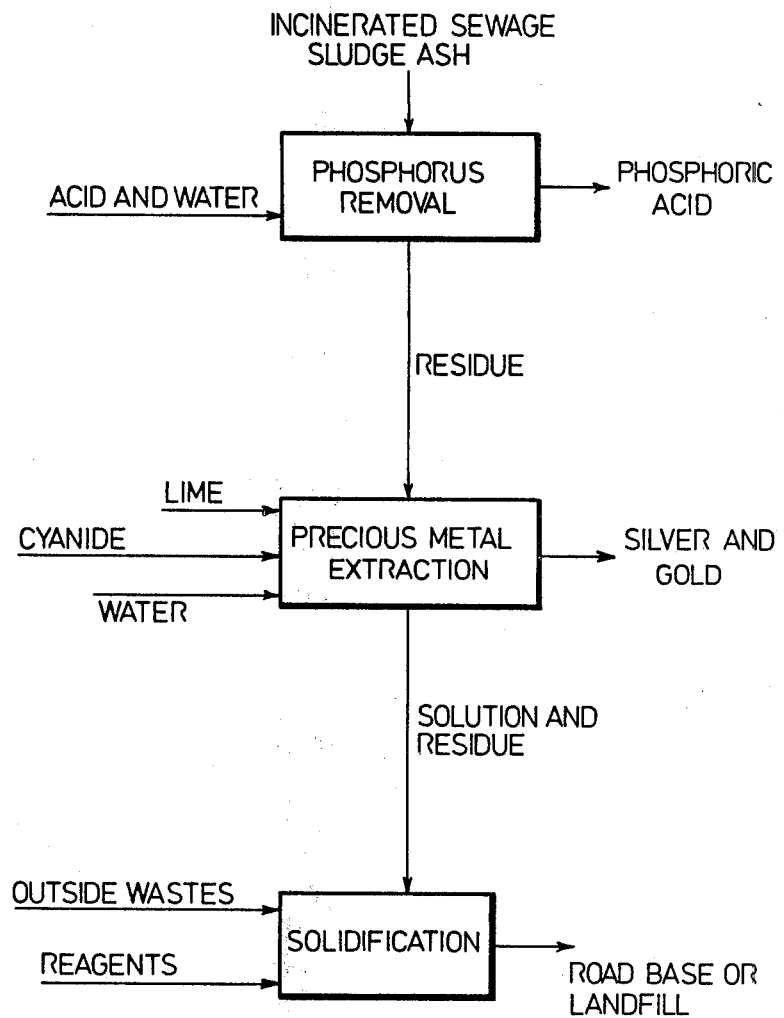

FIGS. 1 and 2 are flow diagrams.

According to the present invention, a process for the treatment of incinerated sewage sludge ash containing silicic compounds and metal values including phosphorus, and at least one precious metal comprises leaching the ash in an acid solution in a first leach to dissolve phosphorus, separating leach solution from undissolved residue, and treating the undissolved residue to recover at least one precious metal.

This invention is based on the discovery that a considerably higher recovery of precious metals can be obtained by treatment of the residue after the ash has been subjected to the phosphorus leach step compared to the recovery obtained if the precious metal recovery step is carried out before the phosphorus leach step. For example, it was found that only about 10% of the precious metals were removed if the precious metal recovery step was carried out before the phosphorus leach step, but that precious metal recovery was over 65% when the precious metal recovery step was carried out after the phosphorus leach step in accordance with the invention.

Preferably, the first leach is carried out under conditions which cause phosphorus to be dissolved in preference to metal values. For example, the ash may be leached in an acid solution at a temperature in the range of from about 0° C. to about 100° C. The acid may be selected from the group consisting of sulphuric acid, hydrochloric acid, perchloric acid, nitric acid, hydrofluoric acid and waste acid solutions. Where the acid is sulphuric acid, the acid solution preferably has a strength in the range of from about 2% to about 30% $H_2SO_4$ (wt/wt) and advantageously contains from about 1.5 to about 3 pounds sulphuric acid per pound of $P_2O_5$ in the ash.

In the first leach, the phosphorus values dissolve as phosphoric acid. After separation of the undissolved residue from the leach solution, the leach solution containing phosphoric acid may for example be treated with ammonia to produce ammonium phosphate product.

Preferably, before the precious metal recovery step, the undissolved residue from the first leach is treated in a second leach in an acid solution under more severe conditions than the first leach to dissolve other metal values, with the second leach solution then being separated from the second undissolved residue, which is then subjected to the precious metals recovery step. The acid used in the second leach may be at least one member of the group specified in the connection with the first leach.

The second leach may be carried out at a temperature in the range of from about 70° C. to about 100° C., and the second leach is preferably carried out in an acid solution of greater strength than the first leach. Where sulphuric acid is used, the strength may be from about 4 to about 9 pounds $H_2SO_4$ per pound of ash iron. To ensure that all required metal values are dissolved, the second leach is preferably commenced with the sulphuric acid at very high strength, for example at least 70% $H_2SO_4$ (wt/wt) and advantageously about 93%, and subsequently diluted to a lower strength, for example about 20%.

The second leach solution, after separation of the second undissolved residue, can be treated for the recovery of iron values and values of other metals such as copper. For example, where the acid used is sulphuric acid, the iron values can be recovered as ferrous sulphate. After recovery of the metal values, the end solution may be recycled to the second leach, with some of the recycled solution being bled off if necessary to avoid build-up of undesirable contaminants in the leach circuit. The solution bleed off may be fed to the solidification step which will be described later.

The second leach step may be omitted if it is not desired to recover iron and the other metals mentioned, in other words if only the separate recovery of phosphorus values and precious metals is desired. Alternatively, the first leach may be carried out under conditions which cause phosphorus and other metal values to dissolve, for example if it is possible to separately recover phosphorus and other metal values from the resultant solution, or if each separate recovery is not desired.

In the first leach step, waste acid from some other process may be used, and in this case contaminants in the waste acid may render the recovered phosphorus values unsuitable for commercial use. The leach solution containing the phosphorus values may be fed to the solidification step which will be described later, instead of being treated for recovery of the phosphorus values.

The undissolved residue from the second leach, or from the first leach if the second leach is omitted, is then treated to recover at least one precious metal, such as gold and/or silver. The precious metals may be extracted by conventional means, such as by cyanide treatment.

After the precious metal recovery step, the remaining solution contains silicic compounds and values of various contaminating metals. This solution and residue is then treated in the manner described in U.S. Pat. No. 4,110,212 issued Aug. 29, 1978. Where the precious metal recovery step includes cyanide treatment, the solidification step destroys the toxicity of any remaining cyanide.

Thus, the solution is reacted (if necessary) with an acidic ferrous salt solution to adjust the pH of the solution to a value within the range of from about 2 to about 5. If desired, at least some of the acidic ferrous salt solution may be obtained from the second leach solution, as previously indicated. The adjusted solution is then reacted with an alkali and, if necessary, also with an alkaline earth metal compound, to raise the pH of the solution to a value of at least 9, and preferably about 12, to cause the silicic compounds in the solution to form large complex silicate molecules with other solids therein with consequent solidification of the solution by gelling and setting into a stable, non-polluting solid.

If desired, other industrial wastes may be fed to the solidification step, together with the solution and residue from the precious metal recovery step, so that such wastes are incorporated into the final solid product.

It has been found that the solidified end product is extremely stable from an environmental point of view, in that undesirable metal values are not readily leached out by rainfall or naturally occurring ground water. Thus, the solidified end product is extremely suitable for use as road base or land fill.

FIG. 1 shows a flow diagram of one embodiment of the invention, a specific example of which is as follows:

A 75 pound sample of sewage sludge incinerator ash was leached with 265 pounds of 10% (wt/wt) $H_2SO_4$ at room temperature. The composition of the ash was:

| Al | 5.0% | P | 7.5% |
|---|---|---|---|
| Ca | 8.5% | K | 0.8% |
| Cr | 0.95% | Na | 0.6% |
| Cu | 0.25% | Ti | 1.2% |
| Fe | 11.3% | Zn | 0.5% |
| Pb | 0.25% | $SiO_2$ | 30% |
| Mg | 1.4% | Au | 6 ppm |
| | | Ag | 275 ppm |

After 4 hours of leaching, the slurry was filtered. The leach solution was neutralized with 16 pounds of aqueous ammonia (28% $NH_3$, wt/wt). The resulting slurry was dried, producing 33 pounds of ammonium phosphate product, the analysis of which was:

| $NH_3-N$ | 11.5% | Ca | 0.15% |
|---|---|---|---|
| $P_2O_3$ | 28.0% | Cu | 0.17% |
| K | 0.5% | Fe | 5.5% |
| S | 10.4% | Mg | 1.6% |
| Al | 2.8% | Mn | 0.15% |
| | | Zn | 0.13% |

Approximately 72% of the ash phosphorus was removed by the dilute acid leach.

The ash residue from the first leach was repulped with 42.5 pounds of sulphuric acid and leached in a second leach at a temperature of 100–120° C. for 4 hours. The slurry was then diluted to 20% solids (wt/wt) and filtered. Iron powder was added to precipitate copper by cementation, and ferrous sulphate was crystallized from the remaining solution. Iron extracted by this leach was equal to 57% of the iron in the untreated ash.

The ash residue from the second leach was treated with lime to raise the pH to about 9 and then leached with 175 pounds of NaCN solution (0.2% $CN^-$) for 48 hours. Analysis of the ash residue showed that 64% of the gold and 73% of the silver were removed by the cyanidation process.

A one kilogram sample of the ash residue from the cyanide leach was combined with 600 ml of acidic mixed industrial liquid wastes, the composition of which was:

pH—<2
Al—45.5 mg/L
Ca—209 mg/L
Cr—2500 mg/L
Cu—33.1 mg/L
Fe—26300 mg/L
Pb—4.35 mg/L
Mg—41.3 mg/L
Mn—211 mg/L
Ni—60.6 mg/L
P—85 mg/L
K—4 mg/L
Ti—3.14 mg/L
Zn—16400 mg/L

The pH of the acid-ash mixture was 3.8. 35 grams of calcium hydroxide were mixed into the ash slurry, raising the pH to 9. A further 50 grams of $Ca(OH)_2$ were added to the mixture, raising the pH over 12. Although the mixture was pourable when placed in the sample cups, it had gelled an hour later.

After one week of curing, the solidified sample did not breakdown when immersed in water. The compressive strength of a one week old sample, as determined using a concrete penetrometer, exceeded 700 pounds per square inch.

After four weeks of curing, a 100 gram solidified ash residue sample was ground to a fine powder and packed in a chromatographic column. Over a 24 hour period of time, 500 ml of deionized water was allowed to percolate through the sample. The analysis of the leachate was:

pH—9
Al—0.37 mg/L
Ca—800 mg/L
Cr—0.065 mg/L
Cu—0.0025 mg/L
Fe—0.005 mg/L
Pb—0.02 mg/L
Mg—88.9 mg/L

Mn—0.007 mg/L
Ni—0.05 mg/L
P—1 mg/L
K—10.4 mg/L
Ti—0.001 mg/L
Zn—0.05 mg/L
Cl—26 mg/L
$SO_4$—350 mg/L

The above results clearly demonstrate the environmentally safe nature of the solidified end product. The example given above has been selected from numerous other tests actually conducted, and consistent results have been obtained.

It will be noted that in the described example phosphorus values, precious metal values, and other metal values are separately recovered from the incinerated sewage sludge ash, and that the end product is a stable, non-polluting solid. Further, it will be noted that the reagents used are readily obtainable, so that the process is very economical in practice.

FIG. 2 shows a flow diagram of another embodiment in which the second leach step has been omitted, with the residue from the first leach step proceeding directly to the precious metal recovery step.

Other embodiments and examples of the invention will be readily apparent to a person skilled in the art, the scope of the invention being defined in the appended claims.

I claim:

1. A process for the treatment of incinerated sewage sludge ash containing silicic compounds and metal values including phosphorus and at least one precious metal, comprising leaching the ash in an acid solution in a first leach to dissolve phosphorus, separating leach solution from undissolved residue, treating the leach solution to recover a phosphorus-containing product, and treating the undissolved residue to recover at least one precious metal.

2. A process according to claim 1 wherein the acid solution contains an acid selected from the group consisting of sulphuric acid, hydrochloric acid, perchloric acid, nitric acid. hydrofluoric acid and waste acid solutions.

3. A process according to claim 2 wherein the acid solution comprises sulphuric acid.

4. A process according to claim 1 wherein the precious metals recovery step includes treatment of undissolved residue by a cyanide.

5. A process according to claim 1 wherein, after the precious metal recovery step, the remaining solution and residue are reacted with an acid ferrous salt solution to adjust the pH of the solution, if necessary, to a value within the range of from about 2 to about 5, the adjusted solution is treated with an alkali, and if necessary also with an alkaline earth metal compound, to raise the pH of the solution to a value of at least 9 to cause the silicic compounds in the solution to form large complex silicate molecules with other solids in the solution with consequent solidification of the solution into a stable, non-polluting solid.

6. A process according to claim 5 wherein at least some of said acidic ferrous salt solution is obtained from the second leach solution of claim 4.

7. A process according to claim 1 wherein said first leach is carried out under conditions which cause phosphorus to be dissolved in preference to other metal values.

8. A process according to claim 7 wherein the ash is leached in acid solution at a temperature in the range of from about 0° C. to about 100° C.

9. A process according to claim 7 wherein the acid solution comprises from about 1.5 to about 3 pounds sulphuric acid per pound of $P_2O_5$ in the ash.

10. A process according to claim 7 including treating the undissolved residue from the first leach in a second leach, before the precious metal recovery step, in a second leach, before the precious metal recovery step, in an acid solution under more severe conditions than the first leach to dissolve other metal values, separating undissolved residue from the second leach solution and subjecting the undissolved residue from the second leach to the precious metals recovery step.

11. A process according to claim 10 wherein the second leach is carried out at a temperature in the range of from about 70° C. to about 120° C.

12. A process according to claim 10 wherein the second leach is carried out in an acid solution of greater strength than the first leach.

13. A process according to claim 10 wherein the acid solution contains an acid selected from the group consisting of sulphuric acid, hydrochloric acid, perchloric acid, nitric acid, hydrofluoric acid and waste acid solutions.

14. A process according to claim 13 wherein the acid solution comprises sulphuric acid.

15. A process according to claim 14 wherein the acid solution comprises from about 4 to about 9 pounds sulphuric acid per pound of iron in the ash.

16. A process according to claim 1 wherein, and the undissolved residue from said first leach is directly treated to recover at least one precious metal.

* * * * *